United States Patent
Jain et al.

(10) Patent No.: US 7,627,510 B2
(45) Date of Patent: Dec. 1, 2009

(54) SYSTEM AND METHOD FOR CONDUCTING COMBINATORIAL EXCHANGES

(75) Inventors: Rahul Jain, Berkeley, CA (US); Charis Kaskiris, Berkeley, CA (US); Pravin Varaiya, Berkeley, CA (US); Jun Shu, State College, PA (US); Ram Rajagopal, Berkeley, CA (US); Nisha Sivasankara Pillai, San Francisco, CA (US)

(73) Assignee: The Regents of the University of California, Oakland, CA (US)

( * ) Notice: Subject to any disclaimer, the term of this patent is extended or adjusted under 35 U.S.C. 154(b) by 291 days.

(21) Appl. No.: 11/389,558

(22) Filed: Mar. 23, 2006

(65) Prior Publication Data

US 2007/0011080 A1 Jan. 11, 2007

Related U.S. Application Data (60) Provisional application No. 60/665,058, filed on Mar. 23, 2005.

(51) Int. Cl.
G06Q 40/00 (2006.01)
(52) U.S. Cl. .......................... 705/35; 705/26; 705/36 R
(58) Field of Classification Search .................. 705/26, 705/35, 36 R, 36 T, 37, 38
See application file for complete search history.

(56) References Cited

U.S. PATENT DOCUMENTS

| | | | | |
|---|---|---|---|---|
| 4,903,201 A | * | 2/1990 | Wagner | ........................ 705/37 |
| 5,077,665 A | * | 12/1991 | Silverman et al. | .............. 705/37 |
| 5,924,082 A | * | 7/1999 | Silverman et al. | .............. 705/37 |
| 2005/0044032 A1 | * | 2/2005 | Lee et al. | ........................ 705/37 |
| 2005/0137939 A1 | * | 6/2005 | Calabria et al. | ................ 705/26 |
| 2005/0144064 A1 | * | 6/2005 | Calabria et al. | ................ 705/37 |
| 2005/0144065 A1 | * | 6/2005 | Calabria et al. | ................ 705/37 |

OTHER PUBLICATIONS

Bajari et al. "Economic Insights Form Internet Auctions" Journal of Economic Literature, vol. XLII (Jun. 2004) pp. 457-486.*
Anonymous "New Trasportation Product Form Schneider Logistics" Jun. 10, 2002, Prnewswire.*
Conitzer et al. "Revenue Failures and Collusion in Combinatorial Auctions and Exchanges With VCG Payments" Jul. 19, 2004, Agent-Mediated Electronic Commerce VI Theories for and Engineering of Distributed Mechanisms and Systems. AAMAS 2004 Workshop.*

* cited by examiner

*Primary Examiner*—Kelly Campen
(74) *Attorney, Agent, or Firm*—Charles J. Kulas; Trellis IP Law Group, PC (57) ABSTRACT

A double-sided exchange may be an exchange wherein both buyers and sellers provide bids for matching via the exchange. A first interface receives buy bids from buyers and a second interface receives sell bids from sellers. A controller matches the sell bids with the buy bids, yielding matched buy bids and matched sell bids in response thereto so that allocations of the matched buy bids and the matched sell bids maximize a surplus of the exchange. An allocation that substantially maximizes an auctioneer's profit and/or announces payments based on sell bids is provided. The announced allocations and prices can be shown to be a substantially competitive equilibrium in some applications.

7 Claims, 3 Drawing Sheets

SYSTEM AND METHOD FOR CONDUCTING COMBINATORIAL EXCHANGES

CLAIM OF PRIORITY

This invention claims priority from U.S. Provisional Patent Application Ser. No. 60/665,058, entitled METHOD AND SYSTEM FOR CONDUCTING COMBINATORIAL AUCTIONS, filed on Mar. 23, 2005, which is hereby incorporated by reference as if set forth in full in this application for all purposes.

ACKNOWLEDGEMENT OF GOVERNMENT SUPPORT

This invention was made with Government support awarded under a grant from Defense Advanced Research Programs Agency (DARPA) contract number F30602-01-0548. The Government has certain rights in this invention.

COMPUTER PROGRAM LISTING APPENDIX

A computer program listing appendix is provided on one CD-ROM with this application. The information on the CD-ROM is hereby incorporated by reference as if set forth in full in this application for all purposes. The CD-ROM is provided in duplicate. Details of the contents of the CD-ROM are provided starting at paragraph [112]. A list of the files on the CD-ROM is included in Table I, below. A portion of the disclosure recited in this application contains material which is subject to copyright protection. Specifically, the computer program listing appendix and possibly other portions of the application may recite or contain source code, data or other functional text. The copyright owner has no objection to the facsimile reproduction of the functional text, otherwise all copyright rights are reserved.

BACKGROUND OF THE INVENTION

This invention is related in general to electronic exchanges and more specifically to an electronic auction, for transferring goods, services, or other things of value.

Systems and methods for exchanging goods, services, or other things of value are employed in various demanding applications including network bandwidth trading, financial-instruments trading, online auctions, transportation logistics, pollution-credit trading, computer-network resource management, electric power allocation, aircraft-parking allocation for air carriers, and so on. Such applications often demand cost-effective readily implementable systems that can optimize benefits obtained for various participants.

For the purposes of the present discussion, an exchange may be any entity or mechanism employed to facilitate trading or transferring one or more things, such as merchandise, bandwidth, time, and so on. Hence, an auction, which may involve buying or selling goods, services, or other things, is a type of exchange.

Advancements in game theory and auction analysis have led to the development of various mechanisms to facilitate exchanging goods, services, and other things of value. For example, the well-known Vickrey-Clarke-Groves (VCG) auctions have been proposed for various exchange-type applications.

Unfortunately, implementations of VCG auctions are often undesirably computationally complex and may require periodic infusions of capital for sustained operability. Such auctions are considered not budget balanced if additional infusions of capital are required.

Furthermore, certain applications may require that certain desirable auction properties, such as efficiency, be compromised. An efficient auction may be an auction that maximizes the aggregate benefit to participants, i.e., the social welfare, when participants act to benefit themselves, i.e., they bid selfishly.

In addition, conventional auction systems and methods often lack capabilities required for various real-world applications, especially applications involving exchange of combinations of items or things, such as portions of sub-links comprising a communication link.

SUMMARY OF EMBODIMENTS OF THE INVENTION

Embodiments of the invention provide a system and method for implementing a double-sided exchange. For the purposes of the present discussion, a double-sided exchange may be an exchange wherein both buyers and sellers provide bids for matching via the exchange. In a specific embodiment, the double-sided exchange includes a first interface for receiving one or more buy bids from one or more buyers and a second interface for receiving one or more sell bids from one or more sellers. A controller matches the sell bids with the buy bids so that allocations of matched buy bids and sell bids yield a maximum exchange surplus. For the purposes of the present discussion, a bid may be any proposal entered by a participant in an exchange.

In a more specific embodiment, the controller further determines a settlement price for an item or other thing to be exchanged via the exchange. The settlement price is determined by a highest ask price among matched sell bids. The settlement price is uniform for similar things being exchanged. Since, the settlement price is based on an ask price provided by a seller, the double-sided exchange is called a seller's-bid exchange.

In the specific embodiment, the double-sided seller's bid exchange is also combinatorial. The one or more buy bids include one or more bid prices for one or more bundles, i.e., combinations of things. The one or more bundles of things must be matched in their entirety for an exchange pertaining to the one or more buy bids to occur.

The one or more sell bids may include one or more ask prices for individual things, and each of the one or more buy bids include an offered buy price for a bundle of things to be exchanged. Each of the sell bids may include an offered sell price for one or more of the things. The controller further determines payments for buyers based on a sum of prices of things in the bundle. Payments to sellers are based on the number of things sold via the exchange multiplied by the settlement prices for the things sold.

Various exchanges implemented according to this embodiment may exhibit a unique combination of properties. In particular, such exchanges may implement non-VCG combinatorial market mechanisms that are budget balanced, approximately incentive compatible, individually rational, and efficient when complete information exists for buyers and sellers.

A market mechanism may be any rule or set of rules or instructions that govern how bids and/or offers from participants in an exchange are matched. An exchange rule may be any rule defining how a buyer should be matched with a seller and/or vice versa.

An individually rational exchange may be an exchange wherein each participant benefits by participation. Participants are said to have complete information if each participant has knowledge about all other participants, including knowledge of strategies available to all participants.

An incentive-compatible exchange may be an exchange wherein truthful bidding represents a dominant strategy. A dominant strategy may be any strategy employed by participants in an exchange, wherein all other strategies yield less desirable results for a given participant for any strategy profile used by others.

An individually rational exchange may be an exchange wherein each participant that bids truthfully derives benefits from participating in the exchange. Generally, exchanges or auctions that benefit each user are individually rational. The degree of benefit obtained by an auction user is called user utility. Users that must pay extra money or otherwise lose value by participating in the exchange are said to experience negative utility. Similarly, users that derive benefits from participating in an auction experience positive utility. Auctions are individually rational if all participants experience positive utility.

Embodiment of the invention can use techniques such as budget-balanced, individually rational, incentive compatible, asymptotically efficient, etc. An asymptotically efficient exchange may be an exchange that becomes increasingly efficient, such as when numbers of participants increase.

A Nash-equilibrium allocation may be any allocation that results from a collective strategy of participants wherein no participant derives benefits by changing strategies. Hence, if each player has chosen a strategy, and no player can benefit by changing his or her strategy, while the other players keep theirs unchanged, then the current set of strategies and the corresponding payoffs constitute a Nash equilibrium. A Bayesian-Nash equilibrium allocation may be a Nash-equilibrium allocation of matched items or things among participants that results from strategies based on incomplete information.

DESCRIPTION OF EMBODIMENTS OF THE INVENTION

For clarity, various well-known components, computer operating systems, communications ports, Internet Service Providers (ISPs), and so on have been omitted from the figures. However, those skilled in the art with access to the present teachings will know which components to implement and how to implement them to meet the needs of a given application.

Figure 1:
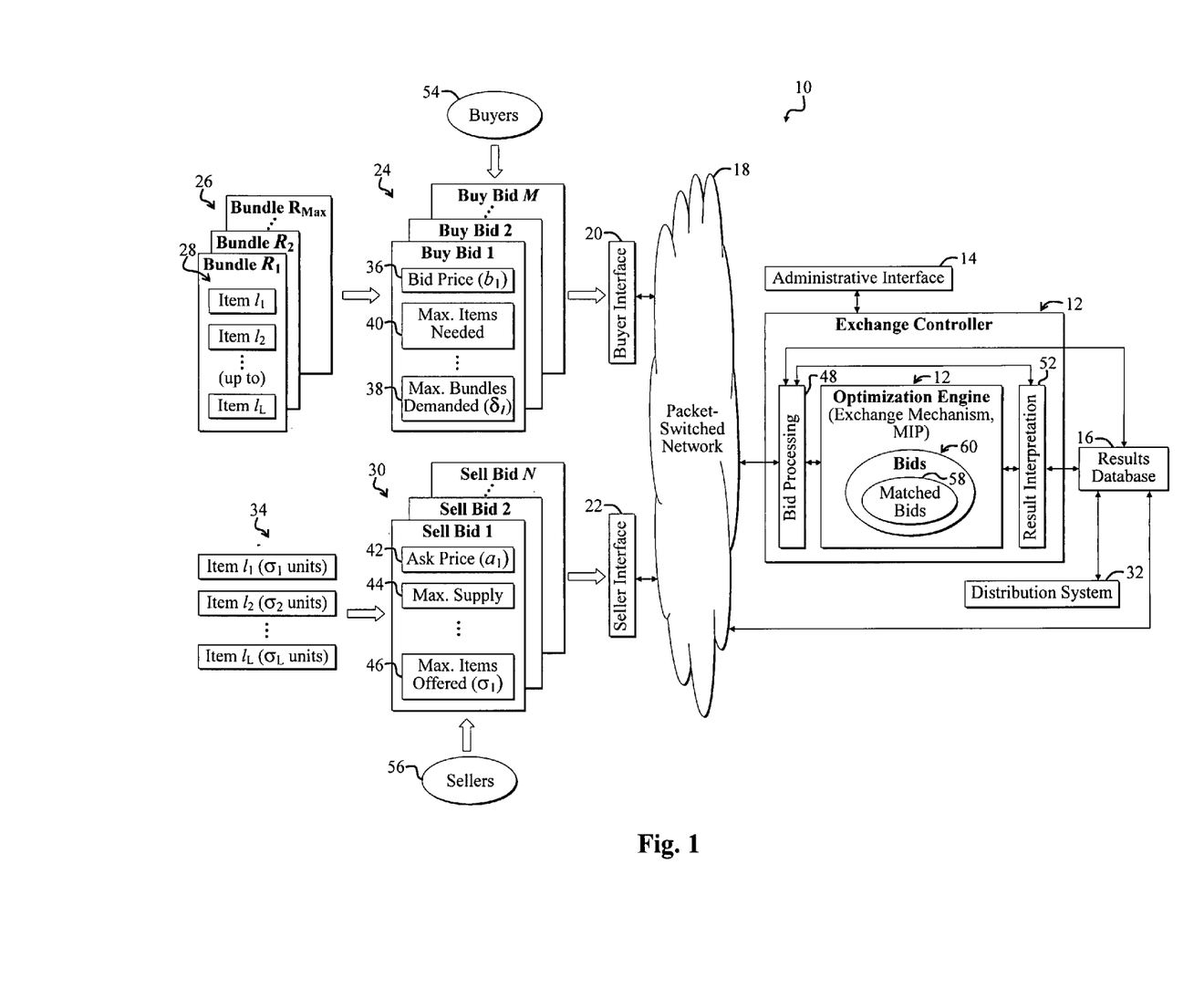
FIG. 1 is a diagram illustrating an exemplary exchange according to an embodiment of the present invention.

FIG. 1 is a diagram illustrating an exemplary exchange 10 according to an embodiment of the present invention. In the present specific embodiment, the exchange 10 includes an exchange controller 12 that is coupled to an administrative interface 14, a database 16, and a packet-switched network 18, such as the Internet. The database 16 is coupled to a distribution system 32. A buyer interface 20 and a seller interface 22 communicate with the auction controller 12 via the packet-switched network 18. The buyer interface 20 is adapted to receive buy bids 24, each corresponding to one or more bundles 26 of to-buy items 28 that buyers 54 are interested in purchasing. Similarly, the seller interface 22 is adapted to receive sell bids 30 each corresponding to one or more to-sell items 34.

For the purposes of the present discussion, a bundle may be any set of things. In the present specific embodiment, the buyers 54 only buy bundles of things that are complete, i.e., that contain all things 28 that are intended to be included in the bundles 26.

For illustrative purposes, the exchange 10 is shown accepting M buy bids 24 via the buyer interface 20. Each of the M buy bids 24 is for one or more corresponding bundles of items 26. Each of the buy bids 24 may correspond to plural bundles without departing from the scope of the present invention. Each bundle 26 includes a subset of L items available. A buyer may submit a buy bid 24 for up to $\delta_i$ bundles of a given type of bundle $R_i$.

Each of the M buy bids 24 include an offered buy price 36 ($b_i$) per bundle of $R_i$, a maximum number of bundles ($\delta_i$) of each type of bundle $R_i$ demanded 38, and a maximum number of bundles needed 40. Each buy bid 24 may include additional information, less information, or different information without departing from the scope of the present invention. For example, the buy prices 36 ($b_i$) per bundle of $R_i$ may be replaced with one or more functions of bids, such as price functions that vary with quantities of items in a bid or vary with times at which a bid is placed.

For the purposes of the present discussion, a function of a bid may be a rule for describing a bid. For example a function may indicate that a bid will be a certain value at a specific time, and then change to another value at another time; or may be a certain value for a specific quantity of items in the bid, and then change for different quantities of items or things.

A price may be any value assigned to an entity, such as a monetary value assigned to an item or a priority value or cost value assigned to or otherwise associated with a thing, such as a network resource. A thing may be any entity, such as a unit of time, an allotment of bandwidth, a unit of money, a stock certificate, or other item.

The exchange 10 accepts N sell bids 30. Each of the N sell bids 30 include an ask price 42 ($a_i$) per item, a maximum supply 44 of each item 34, and a maximum number of offered items ($\sigma_i$) 46 for each type of item $l_i$. Each of the sell bids 30 may include additional information, less information, or different information without departing from the scope of the present invention. For example, the ask prices 42 ($a_i$) may be replaced with functions of ask prices.

The auction controller 12 includes a bid-processing module 48 for facilitating exchanging bid information as needed via the bid interfaces 20, 22 and formatting the bid information before passing the bid information to an optimization engine 50 in the controller 12. The controller 12 further includes a results-interpretation module 52 that interprets results output from the optimization engine 50 before forwarding the results to the database 16. Results stored in the database 16 are selectively employed by the distribution system 32 to facilitate distributing items exchanged via the exchange 10.

In operation, buyer participants 54 enter the buy bids 24 for the bundles 26 of up to L items per bundle into the exchange 10 via a buyer interface 20. Similarly, sellers 56 enter the sell bids 30 for predetermined numbers of each type of item $l_i$ via the seller interface 22. The interfaces 20, 22 may be implemented via software and/or hardware clients, such as Internet browser software, which may access a website associated with the controller 12. Similarly, the administrative interface 14 of the exchange controller 12 may be implemented via a web-based client without departing from the scope of the present invention.

For the purposes of the present discussion, a buyer may be any entity attempting to receive a first thing, such as an item, for second thing, such as money in a transaction involving a seller, wherein the seller may be any entity attempting to receive the second thing for the first thing. Hence, examples of buyers include a purchaser of an item in an auction or a node in a network attempting to obtain additional bandwidth. Corresponding example sellers may be providers of an item in an auction, such as providers of bandwidth in a network.

The exchange controller 12 receives the buy bids 24 and the sell bids 30 from the interfaces 20, 22 via the packet switched network 18. Those skilled in the art will appreciate that various mechanisms, such as Virtual Private Networks (VPNs) may be employed to privatize exchange communications occurring via the packet-switched network 18.

The bid-processing module 48 may receive the buy bids 24 and the sell bids 30 and then format them as needed in preparation for matching via the optimization engine 50. The buyers 54 and sellers 56 may obtain information about current bidding processes, via the results database 16 and/or via the bid-processing system 48, which may retrieve exchange results from the database 16 directly or via the results-interpretation module 52. The bid-processing module 48 may be omitted without departing from the scope of the present invention. In applications wherein the bid-processing module 48 is omitted, any requisite bid formatting may occur at the interfaces 20, 22 or within the optimization engine 50.

Formatted buy bids 20 and sell bids 22 are then forwarded to the optimization engine 50. The optimization engine 50 matches all of the buy bids 20 or a subset thereof with all of the sell bids 22 or subset thereof in accordance with an exchange mechanism. Unlike existing mechanisms, the exchange mechanism implemented by the optimization engine is adapted for use with sell bids and combinatorial buy bids and maximizes the social surplus of the exchange.

For the purposes of the present discussion, a combinatorial bid may be any bid that is for a bundle that includes plural items such as goods, services, etc. In the present specific embodiment, a combinatorial bid is not matched unless all of the things in the bundle associated with the bid are available and matched. Similarly, a combinatorial offer includes an offer of plural items. A combinatorial auction has at least one combinatorial bid or combinatorial offer and may have both a combinatorial bid and combinatorial offer.

A social surplus, also called consumer surplus or welfare of the exchange, may be the aggregate benefit obtained by participants of the exchange 10 from the exchange 10. Alternatively, surplus may be the total of the differences between prices buyers are willing to pay for matched items and prices paid for the matched items, and between prices sellers are willing to sell items for and prices that sellers actually sell the times for.

In the present specific embodiment, net difference between the aggregate value of matched buy bids and the aggregate value of matched sell bids is maximized such that the social surplus is maximized in accordance with a Mixed Integer Program (MIP) as discussed more fully below. This may also maximize an auctioneer's potential profit. For the purposes of the present discussion, a MIP may be any expression or set of expressions adapted to facilitate optimizing one or more values, variables, or characteristics of an exchange.

An exchange may be any entity or collection of entities, such as software and/or hardware, employed to facilitate exchanging or transferring a quantity of an item or thing, such as merchandise, bandwidth, usage, time, and so on. Examples of exchanges include auctions, stock exchanges, systems for trading pollution credits, and so on.

After the optimization engine 50 determines matched buy and sell bids 58, which may be a subset of all bids 60, the matched buy and sell bids 58 may be forwarded to the results-interpretation module 52. The results-interpretation module 52 may implement a pricing routine to facilitate determining a settlement price based on the matched buy and sell bids 58. Alternatively, the pricing routine may be implemented in the optimization engine 50.

The results-interpretation module 52 determines the settlement price for the matched buy and sell bids 58 to be the highest ask-price among matched sell bids. The results-interpretation module 52 may run one or more additional routines for determining payments based on the settlement price or prices. Alternatively, the database 16 may implement appropriate code for determining payments. Payments are established so that a buyer associated with a matched buy bid pays the sum of the prices of items or things in the bundle upon for which the buyer placed a bid. Matched sellers receive a payment equal to the number of units sold multiplied by the price for the item.

Information pertaining to amounts to be paid to the buyers 54 and the sellers 56, and the items or other things to be exchanged therebetween, is stored in the results database 16. The distribution system 32 may then employ the results to facilitate distributing payments and items to the buyers 54 and sellers 56 as needed.

An administrator may employ the administrative interface 14 to make adjustments to the behavior of the exchange controller 12. Exact software details for the administrative interface 14 and other modules employed by the exchange 10 are application-specific and may be readily determined and implemented by those skilled in the art to meet the needs of a given application without undue experimentation.

Hence, the exchange 10 implements a double-sided exchange (wherein both buyers and sellers submit bids), wherein the settlement price is determined by a highest matched ask price among matched sell bids (hence, a seller's bid exchange), and wherein the buyers 54 bid on combinations, i.e., bundles of items of things. Hence, the exchange 10 is the to implement a combinatorial Seller's Bid Double Auction (c-SeBiDA).

For the purposes of the present discussion, a double-sided exchange, also called a double exchange, may be any exchange wherein both sellers and buyers propose prices or otherwise offer bids for one or more things. A combinatorial double-sided exchange, also called a double exchange, may be any exchange where bundles of things are obtained by buyers and/or sellers in response to one more matched sell bids from sellers and one or more matched buy bids from buyers.

Hence, the exchange 10 may be considered a combinatorial double exchange that accepts as input one or more buy bids 24 for bundles 26 of things 28 and one or more sell bids 30 pertaining to things 28 in the bundles 26 of things. A first exchange mechanism, which may be implemented via the exchange controller 12, matches one or more of the buy bids 24 with the one or more sell bids 30 to maximize a social surplus for the exchange 10, yielding one or more matched buy bids and one or more matched sell bids 58 in response thereto. A second exchange mechanism, which may be implemented via the results-interpretation module 52, determines a settlement price for the one or more matched buy bids and the one or matched sell bids 58 based on an ask price offered by one or more sellers 56 associated with the one or more matched sell bids.

The ask price includes a highest ask price (max ($a_j$)) among numbers ($y^*$) of matched sell bids. Each buyer 54 is associated with the one or more buy bids 24 and may be characterized by a first quasi-linear utility function. The first quasi-linear utility function ($u_i^b(x;w,R_i)$) may be defined in accordance with the following equations:

$$u_i^b(x; w, R_i) = \bar{v}_i(x) + w; \quad [1]$$

$$\bar{v}_i(x) = \begin{cases} x \cdot v_i, & \text{for } x \leq \delta_i, \\ \delta_i \cdot v_i, & \text{for } x > \delta_i \end{cases}$$

where x may be an integer $0 \leq x \leq \delta_i$ representing a number of bundles of type $R_i$ that are to be allocated to an $i^{th}$ buyer; w may represent money; $v_i$ may represent a reservation value corresponding to a maximum amount an $i^{th}$ buyer is willing to pay for x bundles.

Each seller 56 that is associated with the one or more sell bids may be characterized by a second quasi-linear utility function. The second quasi-linear utility function may be defined in accordance with the following equations:

$$u_j^s(x; w, L_j) = -\bar{c}_j(y) + w; \quad [2]$$

$$\bar{c}_j(y) = \begin{cases} y \cdot c_j, & \text{for } y \leq \sigma_j, \\ \infty, & \text{for } y > \sigma_j \end{cases}$$

where y may be an integer number of items such that $0 \leq y \leq \sigma_j$, where $\sigma_j$ may be a number of units of an item $l_j$ sold by a $j^{th}$ seller; w may represent money; $c_j$ may represent true cost per item for a the $j^{th}$ seller for y items; and $L_j$ may be a set of all items $l_j$ being sold by the $j^{th}$ seller.

The first exchange mechanism 12 further includes a first module, which may be implemented via the optimization engine 50, that is adapted to determine the matched buy bids and the matched sell bids in accordance with a MIP that is subject to a constraint requiring that supply be greater than or equal to demand.

In the present specific embodiment, the MIP is adapted to maximize social surplus of the exchange in accordance with the following equations:

$$\max_{x,y} \left[ \sum_i b_i x_i - \sum_j a_j y_j \right] \quad [3]$$

$$\text{where } \sum_{j: l \in L_j} y_j \geq \sum_{i: l \in R_i} x_i, \quad \forall\, l \in [1:L],$$

$$x_i \in \{0, 1, \ldots, \delta_i\}, \; \forall\, i, \; y_j \in [0, \sigma_j], \; \forall\, j$$

where $x_i$ may be an integer $0 \leq x_i \leq \delta_i$ representing a number of bundles of type $R_i$ that are to be allocated to an $i^{th}$ buyer; i may be an integer index where $0 \leq i \leq M$ where M may be a number of buyers participating in the exchange; $\delta_i$ may represent a maximum number of bundles of type $R_i$ demanded by the $i^{th}$ buyer; $b_i$ may represent a buy bid price or function thereof per bundle of type $R_i$; $y_j$ may be an integer number of units such that $0 \leq y_j \leq \sigma_j$, where $\sigma_j$ may be a number of units of an item $l_j$ sold by a $j^{th}$ seller, where j may be an integer index, where $0 \leq j \leq N$, where N may be a number of sellers participating in the exchange; and $a_j$ may be an ask price or function thereof for an item $l_j$ offered by the $j^{th}$ seller; L may be a total number of items l being allocated for exchange; and $L_j$ may be a set of all items $l_j$ being sold by the $j^{th}$ seller.

The settlement price ($\hat{p}_l$) for an item (l) is defined according to the following equation:

$$\hat{p}_l = \max\{a_j : y_j^* > 0, l \in L_j\}, \quad [4]$$

where $L_j$ may be a set of items of which item l is an element; $y_j^*$ may be a number of items of type l, corresponding to a $j^{th}$ item, and allocated for sale or exchange and associated with a matched seller ask price.

The resulting allocation ($x^*$, $y^*$) involves $x^*$ matched bundles and $y^*$ matched items comprising the matched bundles $x^*$.

Since each buyer provides a bid price of $b_i$ per bundle, the amount that the buyer pays to a seller for a given matched bundle ($x_i^*=1$) of a bundle of type $R_i$ will be greater than or equal to the sum of the settlement prices $\hat{p}_l$ for each item in the bundle in accordance with the following equation:

$$b_i \geq \sum_{l \in R_i} \hat{p}_l. \quad [5]$$

Otherwise, the surplus $$\left( \max_{x,y} \left( \sum_i b_i x_i - \sum_j a_j y_j \right) \right)$$

defined in equation (3) can be increased by eliminating the corresponding matched bid. Similarly, if $j^{th}$ matched seller is associated with an allocation of $y_j^* > 0$ items to be sold, and $l \in L_j$, then the $j^{th}$ matched sell bid $a_j \leq \hat{p}_l$. Otherwise, the surplus can be increased by eliminating the $j^{th}$ matched sell bid. Hence, the results of the exchange 10 respect individual rationality, and the exchange is individually rational.

Hence, for each $j^{th}$ item, a seller with a lower ask bid ($a_j$) will be matched before one with a higher bid. Consequently, sellers with bid $a_j \leq \hat{p}_l$ sell all of their supply ($y_j^* = \sigma_j$). At most one seller with ask bid $a_j = \hat{p}_l$ sells only a part of his total supply ($y_j^* < \sigma_j$). However, since buyer bids are combinatorial, matched buyers are selected only after solving the MIP in equation (3).

The exchange controller 12 may employ the results-interpretation module 52 to determine payments for buyers based on a sum of prices of items in the bundle that is being purchased by a buyer. The results-interpretation module 52 may further implement one or more routines for determining payments to sellers 56 based on a number of certain things sold via the exchange multiplied by the settlement price for the certain things. Alternatively, such payments are determined via the database 16 and/or the distribution system 32 with reference to the exchange controller 12.

While the embodiment 10 of FIG. 1 has been discussed with respect to bundles, times, and prices, i.e., money for items exchanged, other entities may be employed. For example, money may be replaced with another thing of value, such as bandwidth in an exchange involving trade of network resources between computing nodes.

Those skilled in the art will appreciate that the exchange 10 exhibits various advantageous properties. For example, the exchange 10 represents a non-VCG combinatorial market mechanism that is budget balanced, approximately incentive compatible, individually rational, and efficient when complete information exists for buyers and sellers.

When buyers and sellers have complete information, the exchange 10 is budget-balanced, individually rational, incentive compatible, and asymptotically efficient. An asymptotically efficient exchange may be an exchange that becomes increasingly efficient, such as when numbers of participants increase.

Furthermore, any associated Nash-equilibrium allocation applied to certain embodiments of the present invention, such as a network-resource allocation, is always efficient. Furthermore, semi-symmetric Bayesian-Nash equilibrium allocations are asymptotically efficient. Such unique properties are applicable to various wide-ranging applications involving exchange of goods, services, and/or other entities, such as time, resources, and so on.

The properties of the exchange 10 and related lemmas and theorems are discussed more fully in an attached paper entitled "The Combinatorial Seller's Bid Double Auction: An Asymptotically Efficient Market Mechanism," by Rahul Jain and Pravin Varaiya, dated Feb. 14, 2006.

Figure 2:
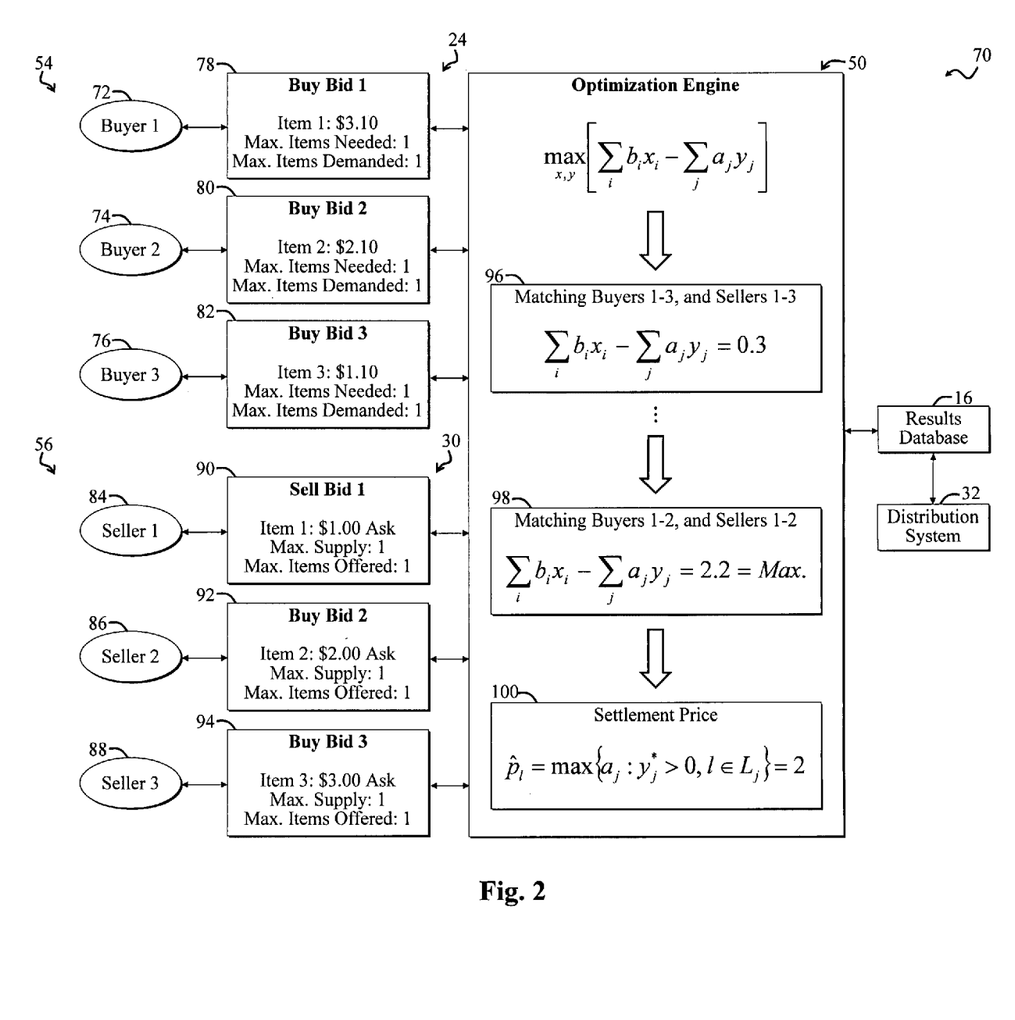
FIG. 2 is a diagram of a specific application of the exchange of FIG. 1 that illustrates operation of an exchange optimization engine.

FIG. 2 is a diagram of a specific implementation 70 of the exchange 10 of FIG. 1 that illustrates operation of the exchange optimization engine 50 for an exemplary application. For clarity, various intervening modules and networks, such as the packet-switched network 18, the interfaces 20, 22, and the results-interpretation module 52 of FIG. 1, are omitted from FIG. 2.

The exemplary exchange 70 has three participating buyers 54, including a first buyer 72, a second buyer 74, and a third buyer 76, which provide a first buy bid 78, a second buy bid 80, and a third buy bid 82, respectively, to the optimization engine 50. Similarly, three participating sellers 56, including a first seller 84, a second seller 86, and a third seller 88, which provide a first sell bid 90, a second sell bid 92, and a third sell bid 94 to the optimization engine 50, respectively.

Each of the buyers 54 want a single bundle with a single item. The first buyer 72 submits the first bid 78 of $3.10 for a first item. The second buyer 74 submits the second bid 80 of $2.10 for a second item. The third buyer 76 submits the third bid 82 of $1.10 for a third item. The first seller 84 submits the first sell bid 90 of $1.00 for the first item. The second seller 86 submits the second sell bid 92 of $2.00 for the second item. The third seller 88 submits the third sell bid 94 of $3.00 for the third item.

The sell bids 30 and the buy bids 24 are then forwarded to the optimization engine 50. For illustrative purposes, the optimization engine 50 is shown performing a first matching operation 96 wherein all of the buyers 72, 74, 76 are matched with all of the sellers 84, 86, 88, respectively, which yields an MIP value of 0.3.

A subsequent matching operation 98 determines that matching the first buyer 54 with the first seller 84 and matching the second buyer 74 with the second seller 86 yields and MIP value of 2.2, which represents the maximum MIP value for the bids 24, 30. Hence, the optimization engine 50 matches the first two buy bids 78, 80 with the first two sell bids 90, 92.

In the present embodiment 70, the optimization engine 50 performs a settlement-price computation 100 according to equation (4). The maximum ask price of a matched bid is $a_j=2$. Consequently, the settlement price $\hat{p}_j=2$.

The results, including information pertaining to matched sell bids 90, 92, matched buy bids 78, 80, and the settlement price are forwarded to the database 16 for use by the distribution system 32.

The mechanism implemented via the optimization engine 50 is a combinatorial double auction mechanism with uniform (i.e., same for all items of the same type) and anonymous (i.e., same for all players independent of their bids and true valuations) prices.

Figure 3:
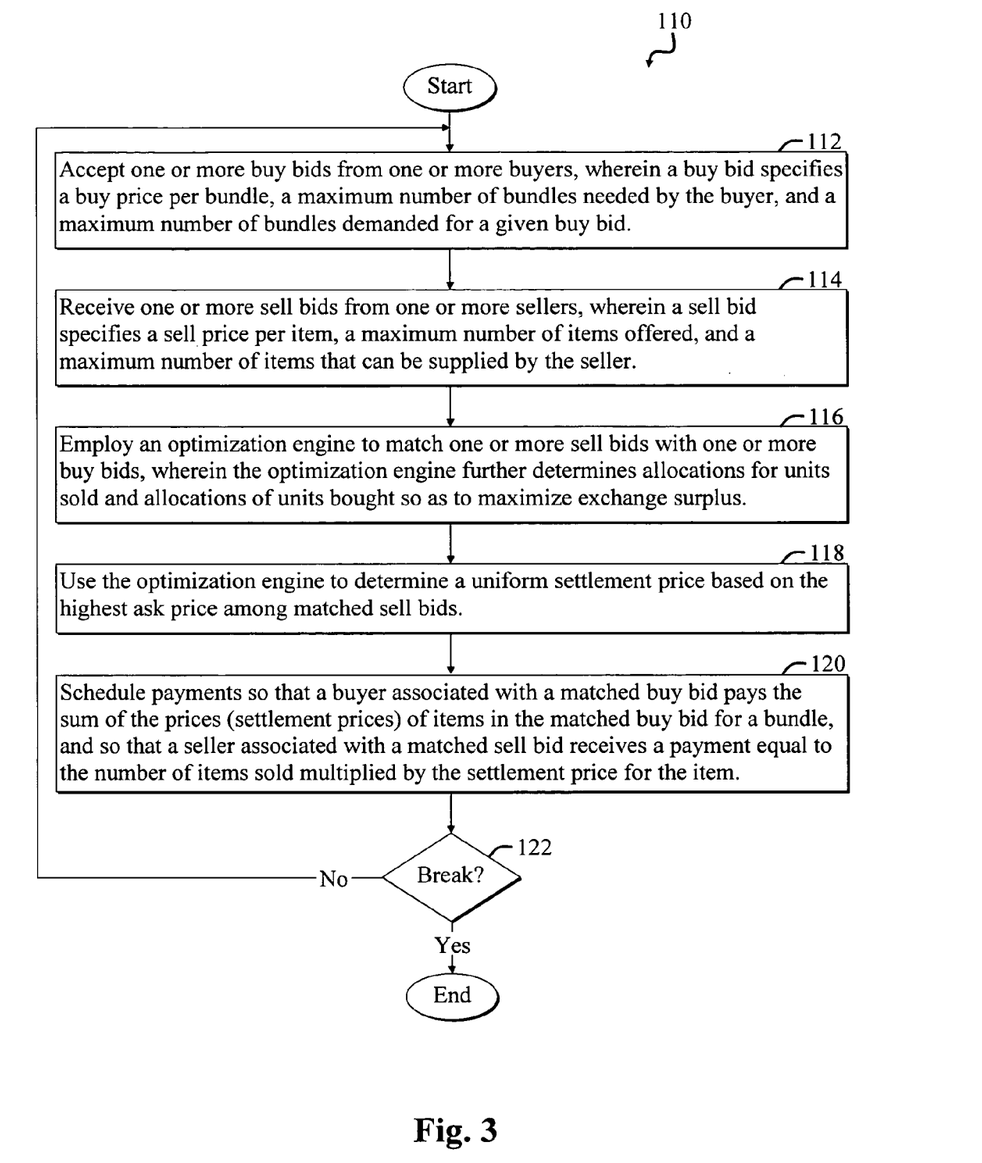
FIG. 3 is a flow diagram of a method adapted for use with the exchange of FIG. 1.

FIG. 3 is a flow diagram of a method 110 adapted for use with the exchange 10 of FIG. 1. The method 110 includes a first bid-accepting step 112, wherein an exchange, such as the exchange 10 of FIG. 1, accepts one or more buy bids from one or more buyers. A buy bid includes information specifying a buy price per bundle, a maximum number of bundles needed by the buyer, and a maximum number of bundles demanded for a given buy bid.

In a second bid-accepting step 114, the exchange or auction receives receive one or more sell bids from one or more sellers. A sell bid specifies a sell price per item, a maximum number of items offered, and a maximum number of items that can be supplied by the seller.

In a subsequent first optimization step 116, the exchange employs an optimization engine, such as the optimization engine 50 of FIGS. 1 and 2, to match one or more sell bids with one or more buy bids by determining allocations for units sold and allocations of units bought so as to maximize exchange surplus. The optimization engine may maximize exchange surplus, also called social surplus, subject to the constraint that supply of a given matched item is greater than demand for the matched item.

Subsequently, a second optimization step 118 involves employing the optimization engine to determine a uniform settlement price for an item to be exchanged based on the highest ask price among all matched sell bids for the item.

Next, a scheduling step 120 includes scheduling payments so that a buyer associated with a matched buy bid pays the sum of the prices (settlement prices) of items in the matched buy bid for a bundle, and so that a seller associated with a matched sell bid receives a payment equal to the number of items sold multiplied by the settlement price for the item.

Subsequently, a break-checking step 122 determines if a system break has occurred. A system break may occur when the exchange is disabled or turned off or otherwise ceases operating. If a system break occurs, the method 110 completes. Otherwise, the method 110 continues at step 112.

The exchange or auction implemented via the method 110 represents a double auction, because both buyers and sellers make bids. It represents a combinatorial auction because, for example, in a bandwidth-trading application, buyers make bids on several links that form a route, and they must receive the same bandwidth on all links. Sellers, however, offer to sell bandwidth on individual links. The associated exchange 10, 70 takes all buy and sell bids, solves an MIP as given in equation (3) that matches bids to maximize the social surplus. The exchange 10, 70 announces settlement prices at which matched bids are settled. The settlement price for a given link is the highest price asked by a matched seller.

Various steps 112-120 of the method 110 may be omitted, changed, or reordered without departing from the scope of the present invention. For example, the first bidding steps 112, 114 may be interchanged. As another example, the method 110 may be replaced with a more generalized method. An exemplary more generalized method involves receiving one or more buy bids and one or more sell bids, wherein the one or more buy bids and/or the one or more sell bids are combinatorial; matching a buy bid with a sell bid in accordance with an exchange rule that maximizes exchange surplus, and providing a matched buy bid and a matched sell bid in response thereto; and determining a settlement price for the combinatorial double exchange based on an ask price associated with the matched sell bid.

Hence, certain embodiments of the present invention may provide a double-sided exchange that is ex post budget balanced, efficient, and individually rational.

Exemplary Applications

A key application for exchange or auction systems is the bandwidth trading market. For example, consider a communication network with links of certain bandwidth between cities. Currently, bandwidth is traded in an inefficient way that prevents optimal resource utilization. Contract negotiation is done by the parties (e.g., via carriers such as AT&T, MCI, and ISPs, such as AOL, Earthlink) on a one-to-one basis with a typical contract lasting several months. In some potential applications, bandwidth may be traded in an exchange just like stock. Further, such trading may be done by autonomous agents. This raises the question of whether efficient equilibrium can exist in such markets and what may be good mechanisms for such markets. Features of such a market include: (i) a commodity is usually traded in some indivisible unit, which may be megabits per second on a given link of a communication network; and (ii) buyers would actually want bundles of links since they would want to establish routes. These exemplary features may be distinctive of bandwidth markets and make the problem combinatorial in nature and, accordingly, difficult to solve. Other markets, such as electricity, pollution, and spectrum allocation for cellular networks are also combinatorial type markets. However, the sheer scale of the problem even in moderate-sized network graphs makes the problem difficult.

Other possible applications include, for example, B2B exchanges, energy, pollution and securities trading, supply chain management, etc.

Combinatorial auctions may also be relevant for distributed control of Multi-Agent Systems (MASs), which are known in the art. Organizing cooperating intelligent agents is a key challenge of computer science, because it involves calibrating rules that provide neutrality to the coordination (typically of buyers) in complex self-organizing systems. A key application is distributed computing environments called "autonomic computing." The automation of business computing systems suggests a reshaping of the "factory floor," securities trading systems and/or complex communications networks.

With reference to FIGS. 1-3, various exchanges 10, 70 according to embodiments of the present invention may be readily adapted to a wide range of applications. For example, one application involves a bandwidth trading market, wherein buyers bid on bundles of links comprising a route or bundles of bandwidth over certain network routes or links.

Another application involves an air-traffic-control application. This application involves one or more metro airports that handle many aircraft takeoffs and landings each hour. Flights may be delayed for weather or other logistical reasons. Controllers or flight schedulers then adjust landing and takeoff schedules accordingly.

For an airline, a change in takeoff schedule at one airport is also accompanied by a change in the landing schedule at another. A flight schedule for an aircraft may be described by a combination of information, including information indicating a take off slot, takeoff time, landing slot, and landing time.

Thus, flight-schedule changes may occur in combinations, i.e., the allocation problem may be considered combinatorial. The slot allocation or reallocation problem can be solved via an exchange constructed in accordance with an embodiment of the present invention. Various participants involved, such as various airlines, are self-interested and have their own selfish economic incentives.

Let $x=1, \ldots, N$ denote the locations and $t=1, \ldots, T$ denote the time-slots on any day. Let $(T, x, t)$ denote a takeoff slot at location x at time t, and $(L, y, s)$ denote a landing slot at location y and time s. A buyer airline then would like to buy a bundle $R=\{(T, x, t), (L, y, s)\}$ of takeoff and landing slots for a flight taking off from x at time t and landing at y at time s for at most b when its maximum willingness (or valuation) is v.

Simultaneously, a seller airline whose flight R has gotten rescheduled might want to offer $(T, x, t)$ and $(L, y, s)$ for sale at $a_T$ and $a_L$, respectively, when its minimum acceptable price (or true cost) might be $c_T$ and $c_L$, respectively. Thus, the slot re-allocation problem can be solved using a combinatorial double-sided auction, such as the exchange 10 of FIG. 1. Use of the exchange 10 of FIG. 1 would yield an efficient allocation that is asymptotically efficient when incomplete information exists.

Another application involves a distributed solution of a complex transportation and logistics problem. In this exemplary application, truckers $1, \ldots, N$ are contracted by firms $1, \ldots, M$. Firm i requires transportation of goods from a location x to a location y, while firm i' requires transportation of goods from a location y to a location z.

A trucker j may offer, to firms i and i', transportation from x to y and then from y to z. An implementation of the embodiment 10 of FIG. 1 may then be employed, whereby participating firms first reveal their transportation requirements, including source and destination. Required truck capacity could vary between firms and be revealed as a requirement. In this case, the firms make sealed buy-bids on their requirements, while the truckers make sealed combinatorial sell-bids. The allocation and prices can then be decided via an embodiment of the present invention that is asymptotically Bayesian-incentive compatible. The allocation would be asymptotically efficient. Hence, very complex problems involving optimal transportation can be efficiently solved via embodiments of the present invention.

Thus, a very complex problem of optimal transportation can be solved efficiently in a distributed manner using the c-SeBiDA mechanism. Another application involves design of an efficient electric power market. In this exemplary application, assume time [0,T] to be slotted. Let a buyer i need 1 MW of power in time slot t. Power in multiple time slots can be bought by making multiple bids. Let the buy bid be $b_i(t)$ when the buyer's true maximum willingness to pay is $v_i(t)$. Further suppose a seller j offers Q MW of power over the time interval [0,T]. This is equivalent to a bundle $R_j=\{(1, Q), \ldots, (T, Q)\}$. The seller specifies a buy bid containing an ask price this bundle $R_j$. Hence, sellers make combinatorial bids, while buyers make non-combinatorial bids.

Consequently, such an application may be suitable for use with an implementation of the embodiment 10 of FIG. 1, wherein buy-bids determine the price of power in each time slot. In such an exchange, the sellers will not have any incentive to act strategically and dishonestly report their true valuation and supply. Furthermore, the exchange would be incentive-compatible when complete information exists and asymptotically Bayesian-incentive compatible when incomplete information exists. Furthermore, the resulting allocation would be efficient. Moreover, the prices would be competitive. Proofs pertaining to such characteristics are discussed more fully in accompanying above-identified papers.

The combinatorial sellers' bid double auction or exchanges 10, 70 of FIGS. 1 and 2 are partially enabled by the use of the optimization engine 50 and accompanying MIP of equations (3), which enables definition of uniform and anonymous (competitive) prices on the links as given by equation (4). Such highly desirable prices yield socially efficient and Pareto-optimal outcomes.

The exchange mechanism represented by equations (3) and implemented via the optimization engine 50 collects all announced bids, matches a subset thereof to maximize the exchange surplus, and then declares a settlement price. In a bandwidth-trading application, the settlement price may be for bandwidth on each link associated with the matched buy and ask bids. This payment rule is described by equation (4). Generally, each matched buy bid is larger, and each matched sell bid is smaller than the settlement price. Hence the accompanying exchange 10, 70 is individually rational.

Certain exchanges implemented according to embodiments discussed herein are asymmetric in that buyers make multi-link combinatorial bids, but sellers make single-link bids. This permits the accompanying exchange 10, 70 to select uniform and anonymous settlement prices for each link.

A given bid may not be truthful. For example, the associated participant may know how the exchange 10, 70 works and formulate the bid to maximize their return. When a participant makes multiple bids, the bids are treated as XOR bids, which are bids wherein at most one bid per player can be a winning bid. Consequently, the outcome is the same as if a matched player only makes (one) winning bid. Thus, embodiments disclosed herein may be analyzed, with practical results, as though each participant makes only one bid.

Hence, embodiments of the present invention relate to multi-item combinatorial double auctions. It can be assumed, for example, in one embodiment that sellers do not have hard constraints and they do not offer bundles (i.e., they offer "loose" bundles, each with just one link or one type of item). For example, if a seller has 5 units of link A and 5 units of link B, he makes two "OR" offers, one with 5 units of link A and another with 5 units of link B, but then within each bundle only a fraction of the units may get sold, say 3 out of 5 units. The buyer's bundles on the other hand are "all-or-none" kind of bundles. If a buyer bids for 5 units of both link A and link B, and if this bid is accepted, the buyer must receive all 5 units on each of the two links. As discussed above, such a requirement may be motivated by realistic situations where buyers want to acquire routes on communication networks. The assumption of "loose" bundles for sellers can allow for a defined uniform prices on links, for example.

According to embodiments of the present invention, the optimal allocation can be determined by solving a linear integer program, also called an MIP, as given by equations (3), that maximizes the trade surplus, also called social surplus, exchange surplus, or auction surplus. Based on the allocation, the highest matched seller's offer can be declared as the price on the link.

According to embodiments of the present invention, the exchange called c-SeBiDA is a combinatorial version of the above but in a framework that allows definition of uniform and/or anonymous (e.g., competitive) prices on the links. Such prices may be highly desirable from an economic perspective as they may yield socially efficient and/or Pareto-optimal outcomes. This may be achieved by very few combinatorial auction mechanisms.

The analysis of combinatorial auctions is usually very difficult, and it may be even more so for combinatorial double auctions. A model can be considered where there are a continuum of buyers and sellers, wherein analysis of the model shows that the auction outcome is a competitive equilibrium. While the model is an idealization of the scenario where there are a large number of agents such that no single agent can affect the auction outcome by themselves, it suggests that the auction's outcome is likely an approximate competitive equilibrium, and hence close to efficient. The methodology used in accordance with embodiments of the present invention casts the mechanism in an optimal control framework and appeals to the maximum principle to conclude that the outcome is indeed a competitive equilibrium. The c-SeBiDA mechanism has been implemented in a software testbed (see, for example, Auction Theory Group, http://auctions.eecs.berkeley.edu, EECS department, University of California, Berkeley, October 2003) and has been used in experiments to validate the mechanism.

In an exemplary general setting, the combinatorial double auctions problem can be described. The auctioneer may act as a broker and is typically faced with the task of matching a subset of the buyers with a subset of the sellers so that an exchange of items can take place. More precisely, let $\Omega$ be the set of items in this market, M be the set of buyers, and N the set of sellers. Further, let $\Xi_1$ be a set of subsets of $\Omega$ on which the buyers can bid. Also, let $\Xi_2$ be the set of subsets of $\Omega$ which the sellers can offer. For each S that is a member of $\Xi_1$, let $b_i(S)$ be the maximum price (e.g., the bid price) the $i^{th}$ buyer is willing to pay for purchasing the subset of items S. Let $s_j(T)$ be the minimum price (e.g., the asking price) the $j^{th}$ seller is willing to accept to sell for T that is a member of $\Xi_2$. A single-round, sealed-bid double auction, where the bid values of each player (e.g., buyer or seller) are conveyed to the auctioneer and remain unknown to the other players can be considered. The auctioneer can decide on the variables $\{x_i(S), y_j(T), S$ that is a member of $\Xi_1$, T that is a member of $\Xi_2\}$, where $x_i(S)=1$ (resp. $x_i(S)=0$) implies the $i^{th}$ buyer's bid on subset S is accepted (resp. not accepted), and $y_j(T)=1$ (resp. $y_j(T)=0$) implies the $j^{th}$ seller's bid on subset T is accepted (resp. not accepted). The auctioneer can then solve the problem as seen in the above-identified Document 8.

As shown, the first two constraints say that at most one bid from any player is accepted. The third constraint says the supply cannot exceed the demand. The problem is combinatorial since the players bid on subsets of items. The above integer programming problem is NP-hard in the general case but can be solved exactly by its linear programming relaxation when the constraint matrices above have a certain structure (see, for example, S. de Vries and R. Vohra, "Combinatorial auctions: A survey", *INFORMS J. of Computing*, 15(3), pp. 284-309, 2003).

Suppose the linear programming relaxation solves the problem IP. Then, the variables for the dual LP, $\pi i$, $\lambda j$ and pl, can be given specific interpretation. For example, $\pi i$ may be the marginal product of the buyer i, $\lambda j$ may be the marginal cost of the seller j and pl may be the competitive price of the link l. However, in general, the LP may not have integral optimal solutions. Accordingly, competitive prices may not exist.

It can be assumed that each player has a private utility value for each subset of items. Let vi(S) denote the maximum amount the $i^{th}$ buyer is willing to pay for subset S and let cj (T) denote the minimum amount the $j^{th}$ bidder is willing to accept for subset S. In general, the players might not bid these true valuations to the auctioneer (i.e., it is possible that vi(S)=bi(S) or cj (T)=sj (T), for example). With these private utility values, the auction can become a game between players exercising selfish and/or strategic bidding behavior, each player trying to maximize their surplus.

The problem formulation above can find an allocation ($x_*$, $y_*$) that maximizes the social surplus, for example. In addition to solving for these decision variables, the auctioneer may also decide on the payments to be made to the sellers and by the buyers. One question is whether there exists a payment policy P that supports this allocation such that the dominant strategy for each player is to bid their true valuations. In this case, the mechanism $((x_*,y_*),P)$ is said to be "incentive compatible." If after the auction is run, each participant finds that his gain from participation is non-negative, we say that the mechanism is "ex-post individual rational" (see, for example, A. Mas-Collel, M. Whinston and J. Green, *Microeconomic theory*, Oxford University Press, 1995).

Henceforth, we can assume that each player submits only one bid. This is without loss of generality as far as mechanism design is concerned. For suppose each player submits "XOR" bids (i.e., each player submits multiple bids but wants only a single bid to be accepted) and we obtain the optimal allocation by a program such as the above. Further, consider another program where the winners of the first program submit only their winning bids while the others submit any one out of their submitted bids. Then, it is clear that the allocation of the two will be substantially the same. Thus, if the payment rule depends only on the accepted bids then both the allocation and the payments will be substantially the same in the two cases.

Embodiments of the present invention can advantageously provide a combinatorial double auction mechanism with uniform (i.e., substantially the same for all items of the same type) and anonymous (i.e., substantially the same for all players independent of their bids and true valuations) prices. The mechanism according to embodiments can maximize the total trading surplus and announce prices based on the accepted bids. However, they need not be competitive prices, as those may not even exist. Nevertheless, as economy scales in size, and conditions of perfect competition prevail, such prices may converge to the competitive prices.

For example, let there be L distinct kinds of items (or links). Consider that there are M buyers and N sellers (shall also treat M and N as the sets [1:M] and [1:N]). As discussed above, we can assume without loss of generality that each player submits only one bid. Let buyer i demand di units of items in the subset Ri (e.g., corresponding to a route in a network) and bid price pi per unit. Let a seller j offer σj units of item lj at ask price qj per unit. Denote $L_j=\{lj\}$. For example, we can assume that while buyers bid on bundles and want full demand be met or none, sellers can offer individual items and can sell any integral part of their capacity (e.g., this may be necessary so that we can define meaningful prices for each of the items and/or links). Let xi and yj be the decision variables, i.e. xi=1 if buyer i's bid is accepted, 0 otherwise. Similarly, yj=1 if seller j's offer is accepted, 0 otherwise. The "matching" allocation ($x_*$, $y_*$) is given by the solution to the mixed integer program as shown in the above-identified Document 8.

The above program can maximize the social surplus (e.g., the value of matched buyers minus cost of matched sellers) subject to the demand less than equal to supply constraint, for example. If the buyers and sellers are truthful in revelation of their valuations and costs, the objective function here is the same as considered in a competitive equilibrium setting when the agents have quasi-linear utilities (see, for example, A. Mas-Collel, M. Whinston and J. Green, *Microeconomic theory*, Oxford University Press, 1995). While sellers' may not be required to sell only integral number of goods in the formulation, since demand equals supply, and buyers receive only integral number of goods, the sellers too may sell only an integral number of goods. Accordingly, unmatched buyers and sellers are not substantially involved in any payments and their allocations do not change.

Details of a specific embodiment are shown in code included in the computer program listing appendix. The code includes executable code, script and data in various formats including php, cpp, bat, xml, txt and others. Hypertext preprocessing (PHP) version 4.3.4 is used in an Apache environment. In general, any suitable coding approach, including different formats and environments, can be used.

The specific embodiment described in the Source Code Appendix allows an administrator to set up an auction for simulation, experimentation or actual use by multiple users. After the auction is configured, auction data including bids and pricing is collected. The auction data is processed by modules including "linkprog.cpp" to generate files for use by third-party software for solving linear optimization problems. In this case, optimization software by Mosek™ is used along with industry-standard MPS files as input and output. Linkprog also generates index files which are used to correlate Mosek output with an auction database.

The optimizing software executes the math functions and provides MPS files as output. The output MPS files along with the index files are input to interpreter.cpp which generates output files such as player.txt and prices.txt. These files are used by modules such as readfiles1.php and readfiles1nav.php to populate the results database. Interface.php is used to examine and present data to human administrators and users.

Table I, below, shows a list of source code files provided on a CD-ROM as a Source Code Appendix for this application. The files are on one CD-ROM. Two identical copies of the CD-ROM are provided. The files were recorded using an International Business Machines (IBM) compatible personal computer running Microsoft™ Windows XP™ operating system and can be viewed with compatible equipment.

TABLE I

| Date Created | File Size | File Name |
| --- | --- | --- |
| 03/21/2006 02:09 AM | 1,396 | access.php |
| 03/21/2006 02:09 AM | 2,987 | accesscontrol.php |
| 03/21/2006 02:09 AM | 1,804 | activate1.php |
| 03/21/2006 02:09 AM | 5,694 | activate1nav.php |
| 03/21/2006 02:09 AM | 9,347 | activate2.php |
| 03/21/2006 02:09 AM | 8,433 | activate2old.php |
| 03/21/2006 02:09 AM | 1,826 | addAuction.php |
| 03/21/2006 02:09 AM | 2,552 | addAuctionAdmin.php |
| 03/21/2006 02:09 AM | 1,557 | addAuctionUsers.php |
| 03/21/2006 02:09 AM | 4,061 | addExperimentAdmin.php |
| 03/21/2006 02:09 AM | 1,648 | addItem.php |
| 03/21/2006 02:09 AM | 2,717 | addItemAdmin.php |
| 03/21/2006 02:09 AM | 1,859 | addUser.php |
| 03/21/2006 02:09 AM | 2,978 | addUserAdmin.php |
| 03/21/2006 02:09 AM | 5,243 | administer.php |
| 03/21/2006 02:09 AM | 6,371 | administer1.php |
| 03/21/2006 02:09 AM | 3,047 | administerRun.php |
| 03/21/2006 02:09 AM | 3,174 | administrator.php |
| 03/21/2006 02:09 AM | 4,233 | administrator1.php |
| 03/21/2006 02:09 AM | 2,638 | admin_common.php |
| 03/21/2006 02:09 AM | 1,081 | auctions.php |
| 03/21/2006 02:09 AM | 1,804 | auctions1.php |
| 03/21/2006 02:09 AM | 3,096 | auctions1nav.php |
| 03/21/2006 02:09 AM | 8,406 | auctions2.php |
| 03/21/2006 02:09 AM | 1,496 | auth01.php |
| 03/21/2006 02:09 AM | 1,793 | authenticateUser.php |
| 03/21/2006 02:09 AM | 1,715 | authentication.inc |
| 03/21/2006 02:09 AM | 2,573 | authentication.php |
| 03/21/2006 02:09 AM | 3,328 | authenticationscript.php |

TABLE I-continued

| Date Created | File Size | File Name |
|---|---|---|
| 03/21/2006 02:09 AM | 1,181 | authority.php |
| 03/21/2006 02:09 AM | 2,601 | bidder.php |
| 03/21/2006 02:09 AM | 2,018 | bidder1.php |
| 03/21/2006 02:09 AM | 1,816 | bidderstatus1.php |
| 03/21/2006 02:09 AM | 5,653 | bidderstatus1nav.php |
| 03/21/2006 02:09 AM | 2,796 | bidderstatus2.php |
| 03/21/2006 02:09 AM | 9,123 | bidsubmission.php |
| 03/21/2006 02:09 AM | 14,553 | bidsubmission1-old.php |
| 03/21/2006 02:09 AM | 12,293 | bidsubmission1.php |
| 03/21/2006 02:09 AM | 10,335 | bidsubmission2(working).php |
| 03/21/2006 02:09 AM | 11,573 | bidsubmission2.php |
| 03/21/2006 02:09 AM | 9,831 | bidsubmission2v1.php |
| 03/21/2006 02:09 AM | 10,317 | bidsubmission2v1w.php |
| 03/21/2006 02:09 AM | 3,227 | calculateEndowment.php |
| 03/21/2006 02:09 AM | 6,451 | changeround1.php |
| 03/21/2006 02:09 AM | 11,859 | changeround2.php |
| 03/21/2006 02:09 AM | 3,918 | charis.php |
| 03/21/2006 02:09 AM | 1,420 | checkboxes.php |
| 03/21/2006 02:09 AM | 2,732 | cleantables.php |
| 03/21/2006 02:09 AM | 1,004 | cleanup.php |
| 03/21/2006 02:09 AM | 9,731 | common.php |
| 03/21/2006 02:09 AM | 1,479 | computeEndowment.php |
| 03/21/2006 02:09 AM | 920 | connection.php |
| 03/21/2006 02:09 AM | 1,397 | control.php |
| 03/21/2006 02:09 AM | 1,497 | controlExperiment.php |
| 03/21/2006 02:09 AM | 1,380 | db.inc |
| 03/21/2006 02:09 AM | 1,892 | db.php |
| 03/21/2006 02:09 AM | 1,152 | destroy.php |
| 03/21/2006 02:09 AM | 1,498 | do__html_header.php |
| 03/21/2006 02:09 AM | 2,968 | dropdown.php |
| 03/21/2006 02:09 AM | 1,977 | editAuction.php |
| 03/21/2006 02:09 AM | 4,251 | editAuctionSetup.php |
| 03/21/2006 02:09 AM | 10,697 | EditHunt.php |
| 03/21/2006 02:09 AM | 2,092 | editItem.php |
| 03/21/2006 02:09 AM | 2,379 | editUser.php |
| 03/21/2006 02:09 AM | 9,631 | endowment1.php |
| 03/21/2006 02:09 AM | 3,619 | endowment2.php |
| 03/21/2006 02:09 AM | 2,714 | endowmentDropDownMenu.php |
| 03/21/2006 02:09 AM | 3,204 | endowtable.php |
| 09/17/2003 12:05 PM | 2,484 | error.inc |
| 03/21/2006 02:09 AM | 2,814 | example.6-5.php |
| 03/21/2006 02:09 AM | 4,916 | example.6-6.php |
| 09/17/2003 12:05 PM | 1,690 | example.8-2.php |
| 03/21/2006 02:09 AM | 1,810 | experiment1.php |
| 03/21/2006 02:09 AM | 5,637 | experiment1nav.php |
| 03/21/2006 02:09 AM | 5,866 | experiment2.php |
| 03/21/2006 02:09 AM | 1,089 | experiments.php |
| 03/21/2006 02:09 AM | 1,813 | experiments1.php |
| 03/21/2006 02:09 AM | 3,096 | experiments1nav.php |
| 03/21/2006 02:09 AM | 5,801 | experiments2.php |
| 03/21/2006 02:09 AM | 1,136 | footer.php |
| 03/21/2006 02:09 AM | 1,071 | footer__admin.php |
| 03/21/2006 02:09 AM | 4,377 | formvalidation.php.php |
| 03/21/2006 02:09 AM | 13,463 | generateFiles--CharisVersion.php |
| 03/21/2006 02:09 AM | 14,664 | generateFiles.php |
| 03/21/2006 02:09 AM | 1,818 | generatefiles1.php |
| 03/21/2006 02:09 AM | 5,641 | generatefiles1nav.php |
| 03/21/2006 02:09 AM | 2,942 | head.php |
| 03/21/2006 02:09 AM | 1,635 | header.php |
| 03/21/2006 02:09 AM | 1,875 | implementationOfCheckboxes.php |
| 03/21/2006 02:09 AM | 1,805 | implementationOfMultipleSelect.php |
| 09/17/2003 12:05 PM | 10,503 | include.inc |
| 03/21/2006 02:09 AM | 1,301 | index.php |
| 03/21/2006 02:09 AM | 2,903 | indViewBids.php |
| 03/21/2006 02:09 AM | 2,589 | insert.php |
| 03/21/2006 02:09 AM | 1,077 | items.php |
| 03/21/2006 02:09 AM | 1,795 | items1.php |
| 03/21/2006 02:09 AM | 3,094 | items1nav.php |
| 03/21/2006 02:09 AM | 3,746 | items2.php |
| 03/21/2006 02:09 AM | 2,659 | listAuctions.php |
| 03/21/2006 02:09 AM | 3,468 | listBids.php |
| 03/21/2006 02:09 AM | 2,195 | listExperiments.php |
| 03/21/2006 02:09 AM | 1,976 | listItems.php |
| 03/21/2006 02:09 AM | 2,152 | listUsers.php |
| 03/21/2006 02:09 AM | 3,761 | login.php |
| 03/21/2006 02:09 AM | 4,164 | login_page(new).php |
| 03/21/2006 02:09 AM | 4,074 | login_page(old).php |
| 03/21/2006 02:09 AM | 4,576 | login__page.php |
| 03/21/2006 02:09 AM | 1,260 | logout.php |
| 09/17/2003 12:05 PM | 382 | lola.php |
| 03/21/2006 02:09 AM | 5,761 | mainindex.php |
| 03/21/2006 02:09 AM | 2,442 | market.php |
| 03/21/2006 02:09 AM | 5,055 | market1.php |
| 03/21/2006 02:09 AM | 1,742 | nav__admin.php |
| 03/21/2006 02:09 AM | 925 | next.php |
| 09/17/2003 12:05 PM | 136,959 | nusoap.php |
| 09/17/2003 12:05 PM | 20 | php.php |
| 09/17/2003 12:05 PM | 13 | phpinfo.php |
| 03/21/2006 02:09 AM | 3,110 | populateAuction.php |
| 03/21/2006 02:09 AM | 1,207 | populateTables.php |
| 03/21/2006 02:09 AM | 1,532 | queryendowment1.php |
| 03/21/2006 02:09 AM | 1,809 | readfiles1.php |
| 03/21/2006 02:09 AM | 5,638 | readfiles1nav.php |
| 03/21/2006 02:09 AM | 3,882 | readResults(working).php |
| 03/21/2006 02:09 AM | 4,577 | readResults.php |
| 03/21/2006 02:09 AM | 4,874 | readResults2(working).php |
| 03/21/2006 02:09 AM | 8,410 | readResults2.php |
| 03/21/2006 02:09 AM | 2,059 | rows(basic).php |
| 03/21/2006 02:09 AM | 3,518 | rows.php |
| 03/21/2006 02:09 AM | 4,430 | rows2(functioning).php |
| 03/21/2006 02:09 AM | 6,134 | rows2.php |
| 03/21/2006 02:09 AM | 8,561 | rows3.php |
| 03/21/2006 02:09 AM | 1,107 | session.php |
| 03/21/2006 02:09 AM | 1,397 | sessions.php |
| 03/21/2006 02:09 AM | 1,853 | soap.php |
| 03/21/2006 02:09 AM | 918 | state.php |
| 03/21/2006 02:09 AM | 7,090 | submitBid(old).php |
| 03/21/2006 02:09 AM | 7,276 | submitBid.php |
| 03/21/2006 02:09 AM | 6,949 | submitBids.php |
| 03/21/2006 02:09 AM | 7,042 | submitBids2.php |
| 03/21/2006 02:09 AM | 8,411 | submitBidsRows.php |
| 03/21/2006 02:09 AM | 959 | test.php |
| 09/17/2003 12:05 PM | 1,582 | testing.php |
| 09/17/2003 12:05 PM | 3,531 | test_mysql.php |
| 03/21/2006 02:09 AM | 1,629 | updateAuction.php |
| 03/21/2006 02:09 AM | 1,711 | updateItem.php |
| 03/21/2006 02:09 AM | 1,823 | updateUser.php |
| 03/21/2006 02:09 AM | 4,264 | user1.php |
| 03/21/2006 02:09 AM | 5,260 | user2.php |
| 03/21/2006 02:09 AM | 2,552 | userheader.php |
| 03/21/2006 02:09 AM | 2,708 | userheader1.php |
| 03/21/2006 02:09 AM | 2,287 | usernav.php |
| 03/21/2006 02:09 AM | 4,531 | usernavigation.php |
| 03/21/2006 02:09 AM | 1,197 | users.php |
| 03/21/2006 02:09 AM | 1,795 | users1.php |
| 03/21/2006 02:09 AM | 3,117 | users1nav.php |
| 03/21/2006 02:09 AM | 4,071 | users2(valid-no).php |
| 03/21/2006 02:09 AM | 5,089 | users2.php |
| 03/21/2006 02:09 AM | 3,114 | users3.php |
| 09/17/2003 12:05 PM | 2,063 | validation.js |
| 03/21/2006 02:09 AM | 3,796 | validation.php |
| 03/21/2006 02:09 AM | 1,304 | validationScript.php |
| 03/21/2006 01:54 AM | 6,094 | validationScriptsMany.php |
| 03/21/2006 02:09 AM | 1,592 | validationtest.php |
| 03/21/2006 02:09 AM | 9,915 | viewbids1.php |
| 03/21/2006 02:09 AM | 3,750 | viewResults.php |
| 03/21/2006 02:09 AM | 1,875 | viewresults1.php |
| 03/21/2006 02:09 AM | 2,919 | viewresults2.php |
| 03/21/2006 07:52 AM | 8,264 | database.sql |
| 03/14/2006 04:32 PM | 107,180 | database.xml |
| 10/09/2003 06:27 PM | 84 | copy.bat |
| 05/24/2004 02:31 PM | 145 | copyfirst.bat |
| 03/21/2006 01:45 AM | 10,443 | interpreter.cpp |
| 03/20/2006 08:17 PM | 18,253 | linprog.cpp |
| 03/21/2006 01:46 AM | 1,210 | parseoutput.cpp |
| 08/31/2005 12:29 PM | 136 | run.bat |
| 09/18/2003 07:52 PM | 602 | run.pl |
| 11/20/2003 11:56 AM | 230 | run.sh |

Variations to the embodiments disclosed herein are possible. For example, while only a single-round mechanism is described above, one skilled in the art will recognize that a mechanism with multiple rounds and/or various stopping rules (e.g., fixed number of rounds, or random stopping, or stopping with some criterion based on change in allocation from previous round) can be designed in accordance with embodiments of the present invention.

Further, there can be an auction participation fee, and/or bids can have reserve prices announced by the auctioneer in accordance with embodiments of the present invention.

While all sellers are always substantially satisfied with their allocations and/or payments, some buyers may not be (i.e., it is possible that some buyers' payments are more than their bids). Therefore, in one aspect of embodiments of the present invention, such buyers can be considered as not matched (e.g., they do not make any payments) and can adjust the matched sellers' allocations and payments accordingly.

Further, no method to solve the problem $MIP_2$ has been specified. As one skilled in the art will recognize, any of the various methods available in the integer programming literature including some linear programming relaxation methods can be used.

In addition, various optimizing software, such as an integer program (IP) or mixed integer program (MIP) optimization software are available, such as the well known CPLEX optimizer available from ILOG, Inc., 1080 Linda Vista Avenue, Mountainview, Calif. 94043, and the MOSEK optimizer from MOSEK ApS C/O Symbion Science Park Fruebjergvej 3, Box 16 2100 Copenhagen Denmark. These may be used to determine an optimal allocation of goods to bids, for example. Details regarding the MOSEK optimizer, and otherlike optimizing software are well known to those skilled in the art.

One aspect of utilizing optimizing software includes the requirement that inputs to the software must be properly formatted. To this end, one or more input variables, one or more constraints and one or more objectives representing the problem to be solved must be input into the optimizing software. Several methods for converting bids that utilize highly expressive logical operators into variables and constraints suitable as inputs into the optimizing software are available.

Although a process or module of the present invention may be presented as a single entity, such as software executing on a single machine, such software and/or modules can readily be executed on multiple machines. Furthermore, multiple different modules and/or programs of embodiments of the present invention may be implemented on one or more machines without departing from the scope thereof.

Any suitable programming language can be used to implement the routines or other instructions employed by various network entities. Exemplary programming languages include nesC, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed simultaneously.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and. examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for implementing a double exchange by using a controller coupled to a network, the method comprising:

accepting a first set of buy bids from buyers via a buyer interface, wherein the first set of buy bids are transferred to the controller over the network;

receiving a first set of sell bids from sellers via a seller interface, wherein the first set of sell bids are transferred to the controller over the network;

matching, by an optimization engine in the controller, one or more sell bids with one or more buy bids, yielding one or more matched buy bids and one or more matched sell bids in response thereto;

determining, by the optimization engine in the controller, a uniform settlement price based on a highest ask price among one or more matched sell bids;

scheduling payments so that matched buyers pay a sum of the settlement prices of items in a matched bid for a bundle of the items, and so that matched sellers receive a payment equal to the number of items sold multiplied by the settlement price for a particular item; and transferring an indication of the scheduled payments to one or more of the buyers or sellers, wherein the indication is transferred over the network.

2. The method of claim 1, wherein the one or more buy bids each include a buy price per bundle, wherein each bundle includes up to ($\delta_i$) items or things.

3. The method of claim 2, wherein the one or more buy bids further specify maximum bundles needed and maximum bundles demanded for a given buy bid.

4. The method of claim 1, wherein the one or more sell bids each include a sell price per item or thing, a maximum number of items or things offered; and maximum supply.

5. The method of claim 4, wherein the optimization engine further determines allocations for units sold and allocations of units bought so as to maximize auction surplus.

6. The method of claim 5, wherein the optimization engine operates with a constraint specifying that supply is greater than demand.

7. The method of claim 6, wherein the optimization engine implements a Mixed Integer Program (MIP).

* * * * *